C. A. FRY.
COVER FOR CONVEYERS.
APPLICATION FILED MAY 12, 1908.

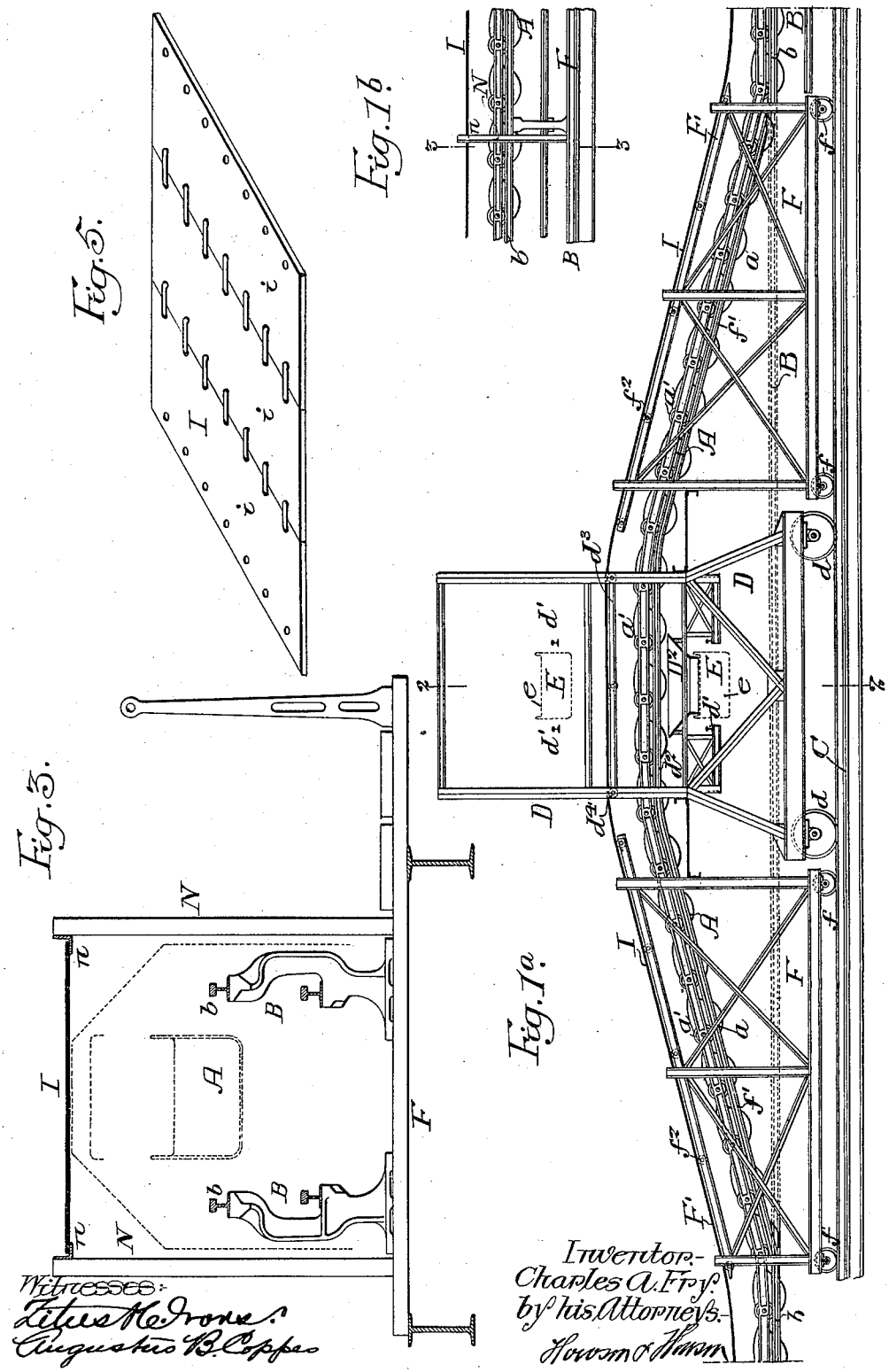

1,023,636.

Patented Apr. 16, 1912.

2 SHEETS—SHEET 2.

Witnesses:

Inventor,
Charles A. Fry,
by his Attorneys

UNITED STATES PATENT OFFICE.

CHARLES A. FRY, OF PHILADELPHIA, PENNSYLVANIA, ASSIGNOR TO LINK-BELT COMPANY, OF PHILADELPHIA, PENNSYLVANIA, A CORPORATION OF ILLINOIS.

COVER FOR CONVEYERS.

1,023,636. Specification of Letters Patent. Patented Apr. 16, 1912.

Application filed May 12, 1908. Serial No. 432,521.

*To all whom it may concern:*

Be it known that I, CHARLES A. FRY, a subject of the King of Great Britain and Ireland, residing in Philadelphia, Pennsylvania, have invented certain Improvements in Covers for Conveyers, of which the following is a specification.

My invention relates to certain improvements in endless conveyers, particularly of the bucket type in which a traveling discharge or loading carriage is used to either receive material from the conveyer or to load the buckets of the conveyer.

My invention is particularly adapted for use in conveying mechanism in which the buckets are exposed to the weather, and the main object of my invention is to provide a cover for the exposed portion of the conveyer, and a further object of the invention is to make the cover flexible so that the discharge device can travel over the conveyer and lift the cover so that the buckets can be either discharged or filled with material.

Figure 4:
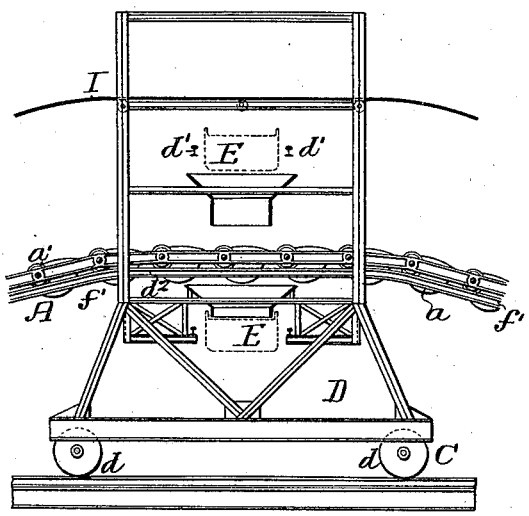
Figure 2:
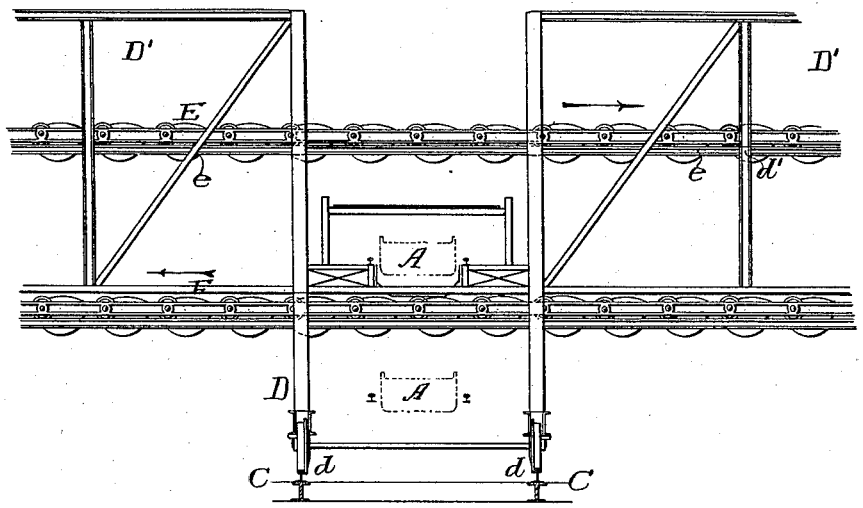

In the accompanying drawing: Figures 1$^a$ and 1$^b$, are side views of sufficient of a conveying apparatus to illustrate my invention; Fig. 2, is a transverse sectional view on the line 2—2, Fig. 1$^a$; Fig. 3, is a transverse sectional view, enlarged, on the line 3—3, Fig. 1$^b$; Fig. 4, is a view showing a modification of the invention, and Fig. 5, is a view of a modified form of cover.

A is the endless chain bucket conveyer having buckets or pans $a$, and this chain is adapted to tracks $b$ on fixed rails B. The conveyer can be driven in any suitable manner.

D is a discharge device known as a traveling trimmer having wheels $d$, $d$ in the present instance mounted on a rail C running the full length of the exposed portion of the conveying mechanism. This trimmer has a lateral extension D', and on this lateral extension are the rails $d'$ for the bucket conveyer E having buckets $e$. The conveyer passes around suitable guide wheels, and one run of the bucket conveyer A and the passes above the bucket conveyer A and the other run of the conveyer E passes below the said bucket conveyer A. By this means the bucket conveyer A can discharge into the buckets on the lower run of the conveyor E, or, in some instances, the mechanism may be so arranged that the buckets of the upper run of the conveyer E may discharge into the buckets of the conveyer A, Fig. 4.

As shown in the drawing, the buckets of the conveyer A discharge into a fixed hopper D$^2$, and this hopper is directly above the line of buckets $e$ on the lower run of the conveyer E. On each side of the traveling trimmer are carriers F having wheels $f$ mounted on the rails C, and these carriers F have inclined rails $f'$ upon which the wheels $a'$ of the conveyer A travel, the rails extending to a point directly above the rails B and are coupled to the rails $d^2$ of the trimmer D so that the conveyer A travels along the rails B up the inclined rails $f'$ over the rails $d^2$ of the trimmer D, down the rails $f'$ on the opposite sides of the trimmer and on to the fixed rails B.

I lay no claim to the above described construction of conveying mechanism and discharge device. My invention relates to the cover and the means for lifting the cover so as to allow for the passage of the trimming device between the cover and the conveyer A.

I is a flexible cover made in the present instance of sheet metal resting upon angle bars $n$, $n$ carried by vertical supporting members N placed a given distance apart, but other means for supporting the cover may be used without departing from the essential features of the invention.

On each inclined carrier F is a plow rail F' having anti-friction rollers $f^2$ in the present instance for supporting the cover I. The plow rail extends to a point near the traveling trimmer and on the trimmer is a rail $d^3$ having rollers $d^4$ which support the cover I. The rails $d^3$ and their rollers $d^4$ are situated between the conveyer A and the upper run of the conveyer E so that the cover I passes between the upper and lower runs of the conveyer E, as shown in Fig. 1$^a$. The buckets of the conveyer A discharge into the buckets $e$ while the said buckets $e$ are on the lower run.

When the trimmer is moved along the rails C so as to shift it from one point to another, the plow rails F' plow under the flexible cover lifting it up and supporting it while the plow rails $f'$ pass under the wheels of the conveyer A and as the conveyer moves it travels up the inclined rails F' across the trimmer D and down the inclined rails $f'$ on the opposite side, the cover protecting the buckets from the weather.

When the material is discharged from the upper run of the trimming conveyer E, then the rails F' and $d^3$ are arranged so as to carry the cover I over the upper run of the conveyer E, as shown in Fig. 4. The flexible cover shown in the present instance is made of a continuous sheet of flexible metal, but it may be made of other flexible material, and made in sections, if desired; or the cover may be made as shown in Fig. 5. In this figure the cover consists of a series of rigid sections $i$ hinged together so as to allow a certain amount of flexibility, but I prefer to use the cover illustrated in Fig. 1$^a$.

I claim:—

1. The combination of a conveyer, means for supporting said conveyer, means for deflecting the conveyer out of its straight course, a flexible cover mounted above the conveyer, and means for deflecting the cover simultaneously with the deflection of the conveyer.

2. The combination of a flexible cover adapted to be used with a conveyer and a traveling trimmer arranged to lift the cover.

3. The combination of an endless conveyer, a flexible cover arranged above the conveyer, and a traveling trimmer for simultaneously lifting the conveyer and the cover.

4. The combination of an endless conveyer, a flexible cover, supports for holding the cover away from the conveyer, a traveling trimmer having guides for the conveyer, and supporting rails for the cover.

In testimony whereof, I have signed my name to this specification in the presence of two subscribing witnesses.

CHARLES A. FRY.

Witnesses:
 Jos. H. Klein,
 Wm. A. Barr.

---

Copies of this patent may be obtained for five cents each, by addressing the "Commissioner of Patents, Washington, D. C."